Dec. 11, 1951     T. G. PIDDUCK     2,577,805
SPRING COMPARATOR
Filed Oct. 11, 1945

INVENTOR
*Thomas G. Pidduck*
BY
Ralph L Chappell
ATTORNEY

Patented Dec. 11, 1951

2,577,805

UNITED STATES PATENT OFFICE 2,577,805

SPRING COMPARATOR

Thomas G. Pidduck, Bremerton, Wash.

Application October 11, 1945, Serial No. 621,668

3 Claims. (Cl. 73—161)

(Granted under the act of March 3, 1883, as
amended April 30, 1928; 370 O. G. 757)

This invention relates to a spring comparator and more particularly to a comparator for leaf springs to enable such springs to be tested for initial straightness and for flexure under load.

Certain types of leaf springs, as for example those used in gyroscopic gun sights or in other precision instruments, must be balanced accurately if the instruments in which they are installed are to function properly. Normally such springs must be perfectly straight or have a predetermined deflection when supported at each end with no load thereon, and they must be deflected predetermined distances when subjected to given external loads.

Objects of the present invention are to provide a comparator for leaf springs that enables such springs to be tested selectively for straightness under no load or for flexure under given loads; to provide a comparator for such springs that supports the springs for testing in a manner similar to that in which they are supported in instruments; to provide a comparator for such springs that supports them in position for straightness or flexure to be measured conveniently by optical means; and to provide a comparator of the character described the use of which enables even a relatively inexperienced operator to test springs rapidly and accurately.

It is a further object of the invention to provide for carrying out the foregoing objects in a facile, economical and efficient manner.

In accomplishing these and other objects of the present invention, I have provided improved details of structure, the preferred form of which is illustrated in the accompanying drawing, wherein.

Figure 1:
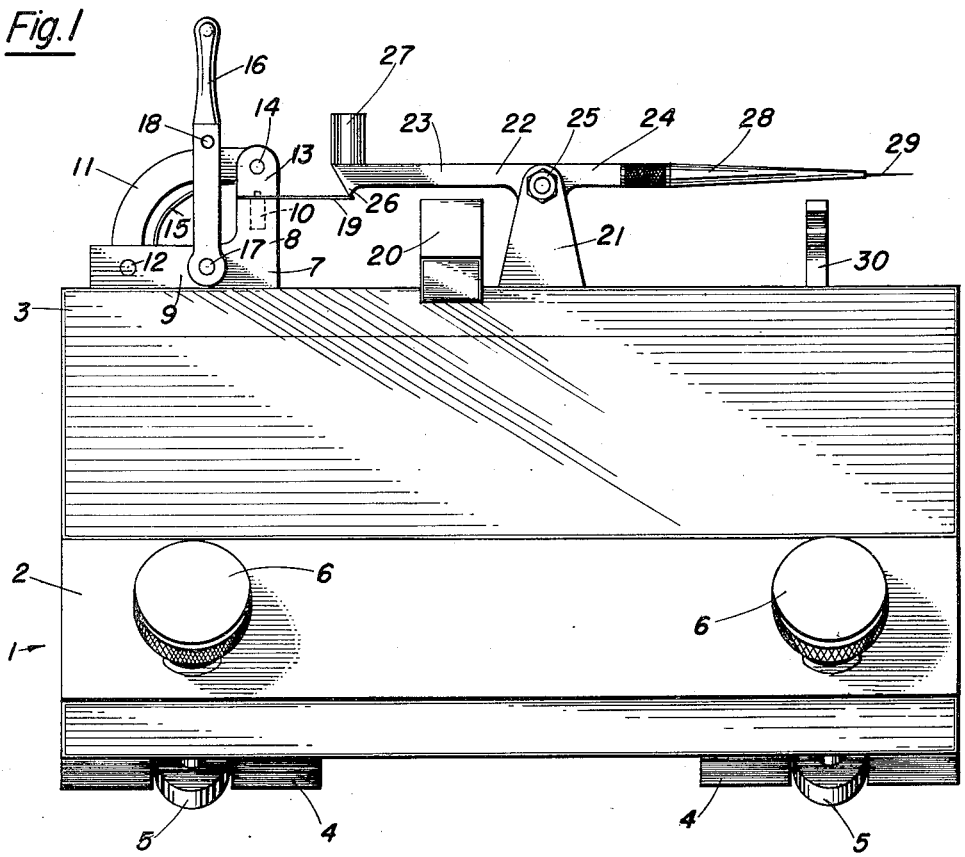
Fig. 1 is a side elevational view of a comparator embodying the features of the present invention and showing a leaf spring mounted thereon for test of flexure under load.

Referring more in detail to the drawing:

The comparator of my invention comprises a base 1, which for convenience in manufacture may be made in a lower section 2 and an upper section 3. Preferably the lower section 2 has spline portions 4 depending from its under face and adapted to fit slidably within a suitable guide groove in a support for the comparator, not shown. Preferably clamp screws 5 and clamp nuts 6 are provided to secure the comparator in adjusted position on the support.

An L-shaped support member 7, having an upright portion 8 and a horizontally disposed portion 9, is suitably secured to the upper face of the upper section 3 of the base. The upper face of the upright portion 8 is planar and is adapted to function as a bearing surface. An upstanding pin 10 is affixed to the upright portion and protrudes from the bearing surface thereof.

An arcuate guide member 11 is pivotally connected adjacent one of its ends with the base, preferably being pivoted to the horizontally disposed portion 9 of the support member 7 within a suitable slot therein on a bearing stud 12. A clamp block 13 is pivotally connected with the guide member 11 adjacent the end thereof opposite the pivot 12 on a pivot stud 14, the clamp block preferably being slotted to receive the end portion of the guide member 11. The dimensions of the elements described are such that the lower face of the clamp block 13 may be superposed on the upper face of the upright portion 8 of the L-shaped member 7. The clamp block 13 is preferably substantially identical in cross sectional configuration to the upright 8 and has a recess or aperture in its lower face adapted to receive the pin 10.

Preferably a leaf spring 15 is provided to act on the guide member and has portions bearing against the guide member 11 and the base to thereby normally urge the guide member to a position in which the clamp block 13 is disengaged from the upright 8.

A bifurcated handle member 16 is pivotally connected with the base, preferably also being pivoted to the horizontally disposed portion 9 of the L-shaped support member 7 on a pivot stud 17. The handle 16 straddles the arcuate guide member 11 and has a bearing stud 18 adapted to bear against the upper arcuate face of the guide member.

A leaf spring 19 to be tested for straightness or for flexure under load may be clamped between the clamp block 13 and the upright 8. The spring 19 is ordinarily of relatively short length and has a securing aperture adjacent an end thereof through which the pin 10 is received. The clamp block 13 is moved into clamping position against the action of the spring 15 by rotating the handle member 16 in a clockwise direction as viewed in the figures of the drawing.

A block 20 is slidably supported on the upper face of the base and the upper face thereof is co-planar with the upper face of the upright 8. The block 20 may be moved under the free end of the spring 19 to support the free end and enable the spring to be tested for straightness under no load, Fig. 2, or the block may be moved to an out-of-the-way position, Fig. 1.

A second upright 21 is suitably secured to the upper face of the base portion 3 and has pivoted thereto a balance arm 22. The balance arm comprises lever arms 23 and 24 which are accurately balanced to exert equal moments about the pivotal mounting 25 of the balance arm.

Figure 2:
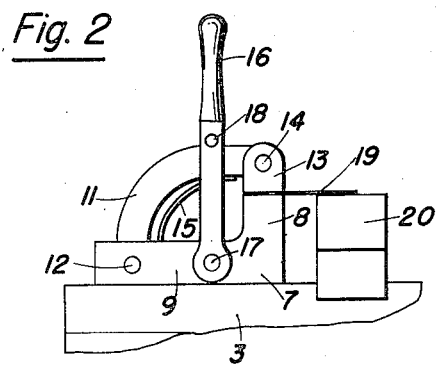
Fig. 2 is a side elevational view of a portion of the comparator shown in Fig. 1, but showing a leaf spring mounted thereon for test of straightness under no load.
Figure 3:
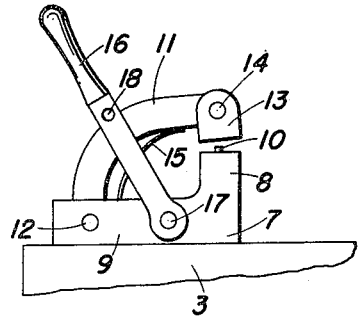
Fig. 3 is a side elevational view similar to Fig. 2, but showing the device with the leaf spring removed.

The arm 23 has a portion 26 adapted to contact the free end portion of the spring 19 undergoing flexure test, Fig. 1. The arm 23 is provided with a seat to position a weight 27 thereon, the seat preferably comprising a spindle which may be received in a suitable bore in the weight.

The arm 24 carries an extension portion 28 which may be adjusted with respect to the arm to adjust the moment exerted by the arm to balance the moment against the moment of the arm 23 with the weight 27 removed therefrom. The extension 28 carries a needle 29 at its outer end.

Preferably a spring clip 30 is suitably secured to the upper face of the base and is adapted to hold the balance arm 22 in an out-of-the-way position while the spring 19 is undergoing test for straightness.

Operation

A leaf spring 19 to be tested for straightness or flexure is secured or clamped in the comparator in a manner hereinbefore described.

If it is desired to test the spring for straightness, the block 20 is moved under the free end thereof. The arm 22 is engaged under the spring clip 30 in an out-of-the-way position.

The normal method of observing the spring for straightness is to cast a beam of light into the plane of the spring in such manner that the beam is bisected by the spring. The image or shadow of the spring may be magnified by known means and observed on a suitable graduated scale of a known type. This conventional method of magnifying dimensions of an article under test is illustrated in the patent to Schoof, Number 2,002,679, issued May 28, 1935.

If it is desired to test the spring for flexure under load, the block 20 is moved to an out-of-the-way position, Fig. 1, and the arm 22 disengaged from the spring clip 30. A weight 27 of known magnitude is placed on the lever arm 23 and the deflection of the needle 29 is observed by the same method used in observing the straightness of the spring.

It is normally desirable to employ a fixed source of light beams. Since the point at which straightness is observed in the straightness test is removed from the point at which deflection is observed in the flexure test, it is advantageous to provide a mounting for the comparator that enables the comparator to be adusted laterally. The comparator may be moved laterally on its support with the spline portions 4 guiding such movement. The comparator may be retained in adjusted position by the clamp screws 5.

While I have shown but one embodiment of my invention, it is susceptible to modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In a device for testing an apertured spring, a base, an upright supported on said base, an upstanding pin on said upright for insertion through the aperture in said spring, a guide member pivotally connected with said base, a clamp block pivotally connected with said guide member and having a recess adapted to receive the free end of said pin, and a bifurcated handle member pivotally connected with said base and straddling said guide member and being cooperable therewith to hold said clamp block in engagement with said pin.

2. In a device of the character described for testing an apertured spring, a base, an upright supported on said base and having a bearing surface for supporting a portion of an article to be tested, an upstanding pin on said upright for insertion into the aperture formed in said spring, an arcuate guide member pivotally connected with said base, a clamp block pivotally connected with said guide member and having a recess for receiving said pin, spring means urging said guide member into a position in which said clamp block is disengaged from said pin, a bifurcated handle member pivotally connected with said base and straddling said guide member and being cooperable therewith to hold said clamp block in engagement with said pin, a second upright supported on said base, a balance arm pivoted to said second upright, said second upright being so spaced from said first upright that one end of said balance arm can engage a portion of said article while said article remains carried by said first upright, the other end of said arm being terminated in an indicating element, and means for retaining said balance arm free of said article.

3. In a device of the character described, a base, means for clamping to the base a spring to be tested for flexure, an arm, means pivotally mounting the arm on said base, the portion of said arm on one side of said pivot means being of predetermined weight and engageable with said spring so that it bears thereon to flex the same, indicating means on the portion of said arm on the other side of said pivot means, and light means cooperating with said indicating means to indicate the amount of flexure of said spring responsive to application of said weight to said spring.

THOMAS G. PIDDUCK.

REFERENCES CITED

The following references are of record in the file of this patent:

UNITED STATES PATENTS

| Number | Name | Date |
|---|---|---|
| 425,658 | Clements | Apr. 15, 1890 |
| 591,421 | Palmer et al. | Oct. 12, 1897 |
| 1,063,838 | Shaw | June 3, 1913 |
| 1,573,865 | Robbins | Feb. 23, 1926 |
| 1,881,813 | Meglitz | Oct. 11, 1932 |
| 2,002,679 | Schoof | May 28, 1935 |
| 2,049,235 | Tour et al. | July 28, 1936 |